United States Patent
Kuo et al.

(10) Patent No.: US 9,077,568 B2
(45) Date of Patent: Jul. 7, 2015

(54) RECEIVING APPARATUS AND METHOD FOR ACCELERATING EQUALIZATION CONVERGENCE

(71) Applicant: MStar Semiconductor, Inc., Hsinchu Hsien (TW)

(72) Inventors: Chih-Cheng Kuo, Hsinchu County (TW); Ko-Yin Lai, Hsinchu County (TW); Tai-Lai Tung, Hsinchu County (TW); Wen-Chieh Yang, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 14/290,082

(22) Filed: May 29, 2014

(65) Prior Publication Data

US 2014/0355659 A1 Dec. 4, 2014

(30) Foreign Application Priority Data

May 31, 2013 (TW) .............................. 102119283 U (51) Int. Cl.
*H04B 1/10* (2006.01)
*H04L 25/02* (2006.01)
*H04L 27/01* (2006.01)
*H04L 25/03* (2006.01)

(52) U.S. Cl.
CPC ............ *H04L 25/0202* (2013.01); *H04L 27/01* (2013.01); *H04L 25/03038* (2013.01)

(58) Field of Classification Search
CPC ...................... H04L 25/03038; H04L 27/2647

USPC .......................................................... 375/350
See application file for complete search history.

(56) References Cited

U.S. PATENT DOCUMENTS

| | | | |
|---|---|---|---|
| 5,280,355 A * | 1/1994 | Dieterich ...................... | 348/614 |
| 6,608,862 B1 | 8/2003 | Zangi et al. | |
| 6,622,118 B1 * | 9/2003 | Crooks et al. ................. | 702/190 |
| 2003/0231721 A1 * | 12/2003 | Rouphael et al. ............ | 375/341 |
| 2004/0017846 A1 * | 1/2004 | Fernandez-Corbaton et al. ............................. | 375/152 |
| 2006/0125817 A1 * | 6/2006 | He .................................. | 345/213 |
| 2006/0128326 A1 | 6/2006 | Pietraski | |
| 2006/0267635 A1 * | 11/2006 | Metz et al. ......................... | 327/2 |
| 2007/0127557 A1 * | 6/2007 | Subrahmanya et al. ....... | 375/148 |
| 2007/0242599 A1 * | 10/2007 | Gorday et al. ................. | 370/208 |
| 2008/0137788 A1 * | 6/2008 | Bang et al. ..................... | 375/350 |
| 2008/0214134 A1 * | 9/2008 | Shi et al. ........................ | 455/295 |

(Continued)

FOREIGN PATENT DOCUMENTS

| TW | 200704048 | 1/2007 |
|---|---|---|
| TW | 201236453 | 9/2012 |

OTHER PUBLICATIONS

Taiwan Patent Office, "Office Action," Feb. 11, 2015.

*Primary Examiner* — Santiago Garcia
(74) *Attorney, Agent, or Firm* — WPAT, PC; Justin King (57) ABSTRACT

A receiving apparatus applied to a receiving end of a communication device having an equalizer is provided. The receiving apparatus includes a filter and a channel estimator. The filter filters a received signal to reduce a multipath effect of the received signal and outputs a filtered signal. The channel estimator performs channel estimation on the received signal to generate an estimation result. The estimation result is for determining which of the received signal and the filtered signal is to be selected and sent to the equalizer.

15 Claims, 12 Drawing Sheets

(56) References Cited

U.S. PATENT DOCUMENTS

| | | | |
|---|---|---|---|
| 2009/0110049 A1* | 4/2009 | Luschi et al. | 375/233 |
| 2009/0111413 A1* | 4/2009 | Luschi et al. | 455/230 |
| 2010/0061495 A1* | 3/2010 | Cho et al. | 375/346 |
| 2010/0232491 A1* | 9/2010 | Hayashi | 375/229 |
| 2010/0278284 A1* | 11/2010 | Abrishamkar et al. | 375/320 |
| 2010/0296553 A1* | 11/2010 | Luschi et al. | 375/148 |
| 2011/0032837 A1* | 2/2011 | Luschi et al. | 370/252 |
| 2011/0194659 A1* | 8/2011 | Kenney | 375/355 |
| 2011/0243280 A1* | 10/2011 | Hayashi | 375/340 |
| 2012/0087406 A1* | 4/2012 | Lim et al. | 375/232 |
| 2013/0202022 A1* | 8/2013 | Cai | 375/232 |
| 2013/0251074 A1* | 9/2013 | Uln | 375/341 |

* cited by examiner

RECEIVING APPARATUS AND METHOD FOR ACCELERATING EQUALIZATION CONVERGENCE

This application claims the benefit of Taiwan application Serial No. 102119283, filed May 31, 2013, the subject matter of which is incorporated herein by reference.

BACKGROUND OF THE INVENTION

1. Field of the Invention

The invention relates in general to a receiver, and more particularly to a receiver that pre-filters according to a channel estimation result.

2. Description of the Related Art

In modern communication technologies, a transmitting end and a receiving end adopt a communication protocol or standard understood by both parties to promote the communication between the two parties. Signals transmitted by the transmitting end pass through a transmission channel and are received by the receiving end. As the signals may be mixed with various interferences and noises in the transmission channel, the signals may attenuate during the transmission process. Thus, the receiving end frequently utilizes a known pilot signal in the signals to perform channel estimation. Having estimated the effect that the channel poses on the signals, the received signals are equalized to restore the received signals into original signals transmitted from the transmitting end.

Figure 1:
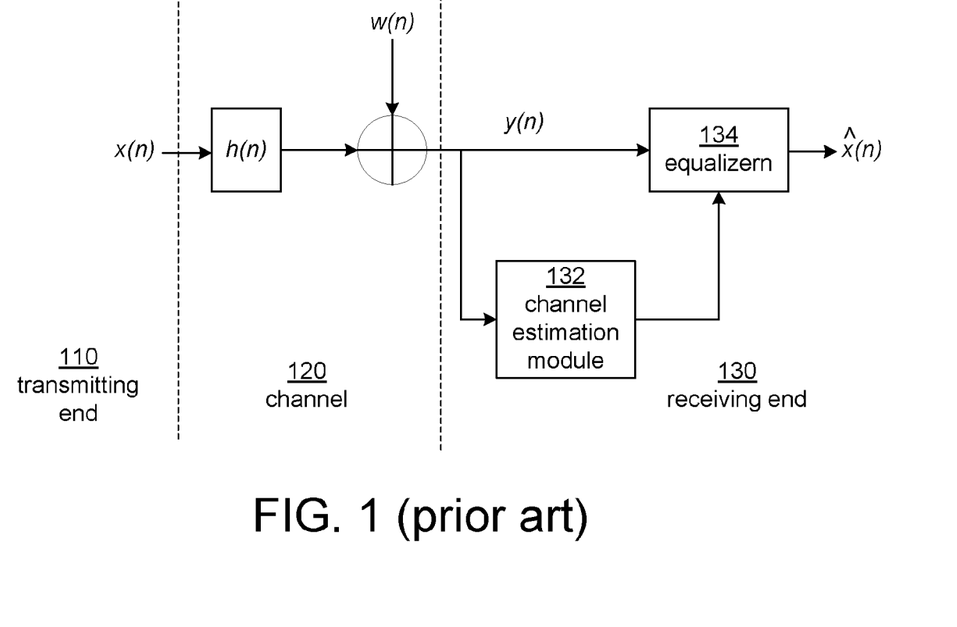
FIG. 1 is a schematic diagram of a model of channel propagation.

FIG. 1 shows a schematic diagram of a model of channel propagation in the prior art. A signal transmitted from a transmitting end 110 is represented by x(n), and a signal received at a receiving end 130 is represented by y(n). The signal x(n) is distorted and contaminated when passing through a channel 120.

Under certain circumstances, the channel 120 may result in a more complex multipath effect. The so-called multipath effect refers to an effect that the signal x(n) arrives at the receiving end 130 at different time points via multiple paths due to different lengths of the paths. Not only the signal strength of the signal x(n) transmitted via the paths is attenuated, but also the signal arriving at different time points may pose interferences on subsequent signals. In FIG. 1, the influence that the multipath effect poses on the signal is represented by h(n).

In addition to the signal distortion caused by the multipath effect h(n), a channel 120 that does not suffer from particular interferences further receives random interferences. Such random interferences are commonly referred to as the additive white Gaussian noise (AWGN), which is represented by w(n) in FIG. 1.

Having undergone the distortion and contamination of the multipath effect h(n) and the AWGN w(n), the signal received at the receiving end 130 passes through a channel estimation module 132. By utilizing channel impulse response (CIR) estimation, the channel estimation module 132 sends an estimated message to an equalizer 134 to compensate the distortion and contamination that the channel 120 causes on the signal. Thus, a compensated signal x̂(n) outputted by the equalizer 134 is similar to the signal x(n) transmitted from the transmitting end 110.

Although the above conventional channel estimation module 132 treats the multipath effect, for a signal that has the same signal strength and arrives via numerous different paths, the compensation provided by the equalizer 134 still requires a lengthy period for iterated processes on the signal to converge to a usable level.

Figure 2A:
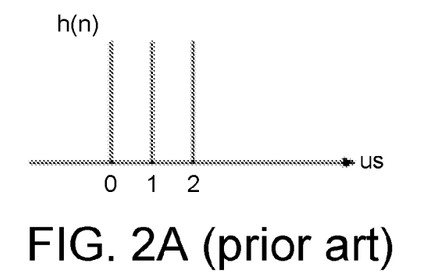
FIG. 2A is a schematic diagram of a multipath effect.

FIG. 2A shows a schematic diagram of a multipath effect. In FIG. 2A, a multipath effect h(n) of a signal that is transmitted from the transmitting end 110 and passes through three paths is depicted. After passing through the three paths, due to differences in the lengths of the paths, the signal arrives the receiving end 130 at time points that are spaced by an equal interval. Further, the energy of the signal is evenly propagated along the three paths, meaning that the amounts of energy allotted to the paths are substantially equal. In other words, none of the three paths is considered as a primary path having the highest amount of energy or a secondary path having a lower amount of energy.

Figure 2B:
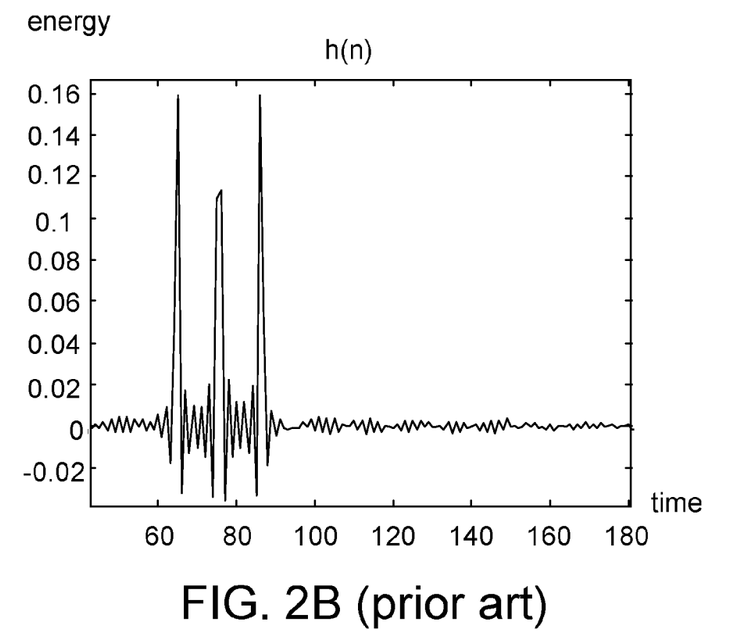
FIG. 2B is a diagram of actual measurements of the multipath effect in FIG. 2A.

FIG. 2B shows a diagram of actual measurements of the multipath effect in FIG. 2A. In FIG. 2B, three rising energy peak values represent the transmission time of the signal in the three different paths.

In a conventional design of the equalizer 134, e.g., a decision feedback equalizer (DFE), a feedback signal is processed in iteration for a received signal. When the multipath effect h(n) shown in FIG. 2A and FIG. 2B is received, the primary path having the highest amount of energy cannot be determined, and so the equalizer 134 requires a quite long time to adjust parameters to achieve convergence.

Figure 3:
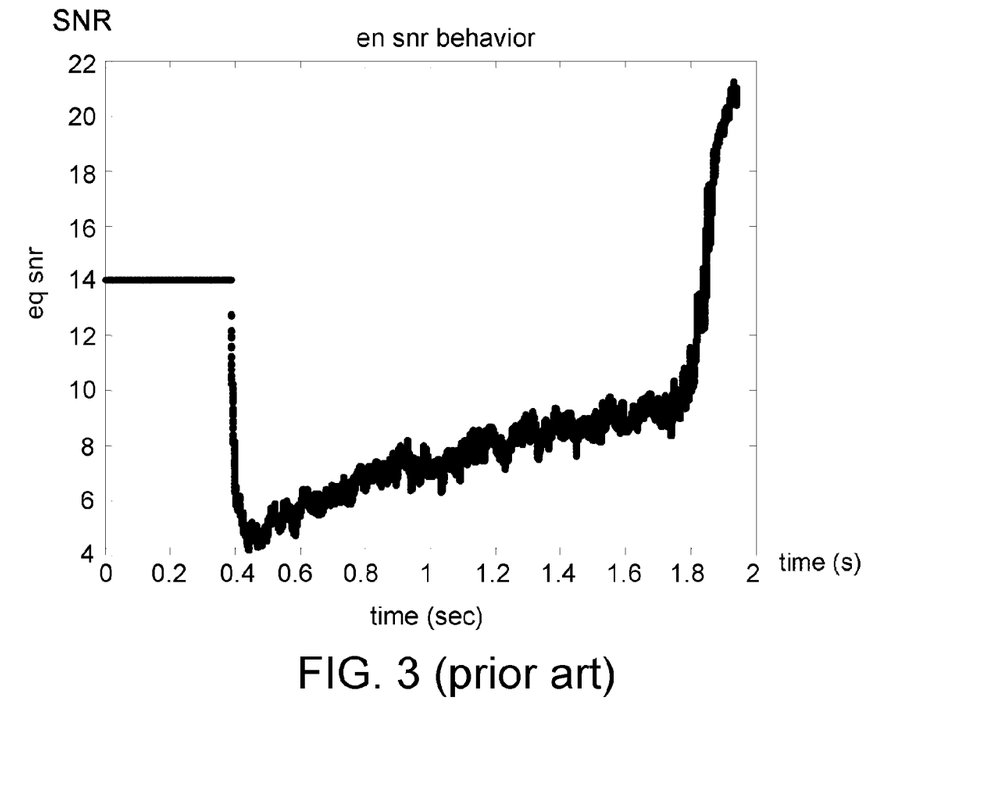
FIG. 3 is a schematic diagram of an SNR of the equalizer under the multipath effect in FIG. 2A and FIG. 2B.

FIG. 3 shows a diagram of a signal-to-noise ratio (SNR) of the equalizer 134 versus the time under the multipath effect in FIG. 2A and FIG. 2B. Starting from the signal of the first path, the equalizer begins iterated calculations. However, since which of the paths is the primary path having the highest amount of energy cannot be determined, the equalizer needs to spend more than one second to increase the SNR of the output signal to a level that can be applied in subsequent processing.

For high-speed modern communication systems, it is unacceptable that the equalization requires such long convergence time under a multipath effect. Therefore, there is a need for an apparatus and method that overcomes the multipath effect and enables equalizer 134 to timely output a high SNR to further allow the receiving end 130 to quickly receive the signal.

SUMMARY OF THE INVENTION

According to an embodiment the present invention, a receiving apparatus is provided. The receiving apparatus is applied to a receiving end of a communication device having an equalizer. The receiving apparatus includes: a filter, configured to filter a received signal to reduce a multipath effect of the received signal and to output a filtered signal; and a channel estimator, configured to perform channel estimation on the received signal to generate an estimation result. The estimation result is for determining which of the received signal and the filtered signal is to be selected and sent to the equalizer.

According to another embodiment of the present invention, a receiving method is provided. The receiving method is applied to a receiving end of a communication device having an equalizer. The receiving method includes: filtering a received signal to reduce a multipath effect of the received signal and outputting a filtered signal; performing channel estimation on the received signal to accordingly generate an estimation result; and determining which of the received signal and the filtered signal is to be selected and sent to the equalizer according to the estimation result.

The above and other aspects of the invention will become better understood with regard to the following detailed

DETAILED DESCRIPTION OF THE INVENTION

Embodiments of the present invention are described in detail below. Apart from the disclosed embodiments, the present invention is also applicable to other embodiments. The scope of the present invention is not limited by the embodiments, and is defined in accordance with the appended claims. To better describe the contents of the present invention to one person skilled in the art and to keep the diagrams clear, certain sizes and other associated scales may be emphasized to appear exaggerated, with unrelated details not entirely depicted.

In the model in FIG. 1, the digital signal received by the equalizer 134 bears the influence of the multipath effect, thus a high SNR cannot be converged and obtained within a short time. Therefore, a feature of the present invention is to first filter the digital signal received by the equalizer 134. Particularly, a digital signal is filtered according to a channel estimation result to reduce the influence of the multipath effect in the digital signal received by the equalizer 134, thereby accelerating the convergence for obtaining a high SNR for the equalizer 134. With the above feature, the convergence time required is significantly shortened. The above technical feature of the present invention is explained in the exemplary embodiments below.

Figure 4A:
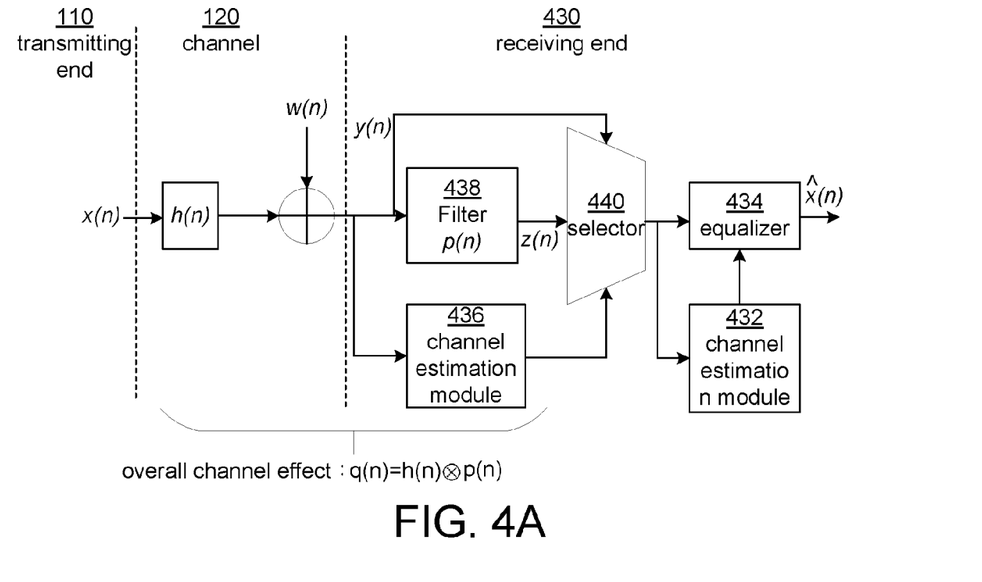
FIG. 4A is a block diagram of a receiving end according to an embodiment of the present invention.

FIG. 4A shows a block diagram of a receiving end 430 according to an embodiment of the present invention. Compared to the schematic diagram in FIG. 1, the embodiment in FIG. 4A similarly includes a channel estimation module 432 and an equalizer 434. Different from the prior art in FIG. 1, in FIG. 4A, a channel estimation module 436, a filter 438 and a selector 440 are disposed before the equalizer 434. The selector 440 may include two input signals, i.e., a signal y(n) received by the receiving end 430 and an output signal z(n) from the filter 438. According to a channel estimation result of channel estimation performed by the channel estimation module 436 on the signal y(n) received at the receiving end 430, the selector 440 may select one of the input signals y(n) and z(n) and input the selected signal to the equalizer 434 and the channel estimation module 432. The estimation result outputted by the channel estimation module 436 is associated with a level of the multipath effect.

The effect that the filter 440 has on a signal is denoted as p(n). In an embodiment, the function of the filter 440 is to enlarge an energy difference between a first-path signal and a second-path signal in the received signal. Thus, after the signal y(n) received by the receiving end 430 passes through the filter 438, an overall channel effect on the equalizer 434 is q(n)=h(n) $\otimes$ p(n), where $\otimes$ represents linear convolution. In an embodiment, when the channel estimation result of the channel estimation module 436 indicates the presence of a multipath effect, the selector 440 selects and outputs the input signal z(n). In other words, after the signal y(n) passes through the filter 438 and becomes the filtered signal z(n) that is sent to the equalizer 434, the multipath effect is improved. For example, a primary path having a higher peak value occurs in a way that the convergence of the equalizer 434 is greatly accelerated.

However, the multipath effect h(n) does not occur at all times in the channel 120, or the multipath effect h(n) is not that noticeable. In another embodiment, when the channel estimation result of the channel estimation module 436 indicates no multipath effect is present or the multipath effect is smaller than a threshold, the selector 440 selects and sends the input signal y(n) to the equalizer 434. In another embodiment, for example, assuming that there are two paths, and the energy of the signal transmitted by the primary path is much higher than that of the signal transmitted by the secondary path, the equalizer 434 is capable of quickly converging the SNR. In the above situation, when the channel estimation result of the channel estimation module 436 indicates that the filtering function of the filter 438 is not required, the selector 440 may also select and send the input signal y(n) to the equalizer 434.

In other words, the channel estimation module 436 in the receiving end 430 in FIG. 4A performs channel estimation on the signal y(n) received at the receiving end 430. When the channel estimation module 436 deems that the multipath effect h(n) reaches a predetermined level, the channel estimation module 436 renders the received signal y(n) to be corrected via the filter 438 to obtain the signal z(n) that is then forwarded to the equalizer 434. Else, the received signal y(n) is rendered to bypass the filter 438 to directly enter the equalizer 434.

Figure 4B:
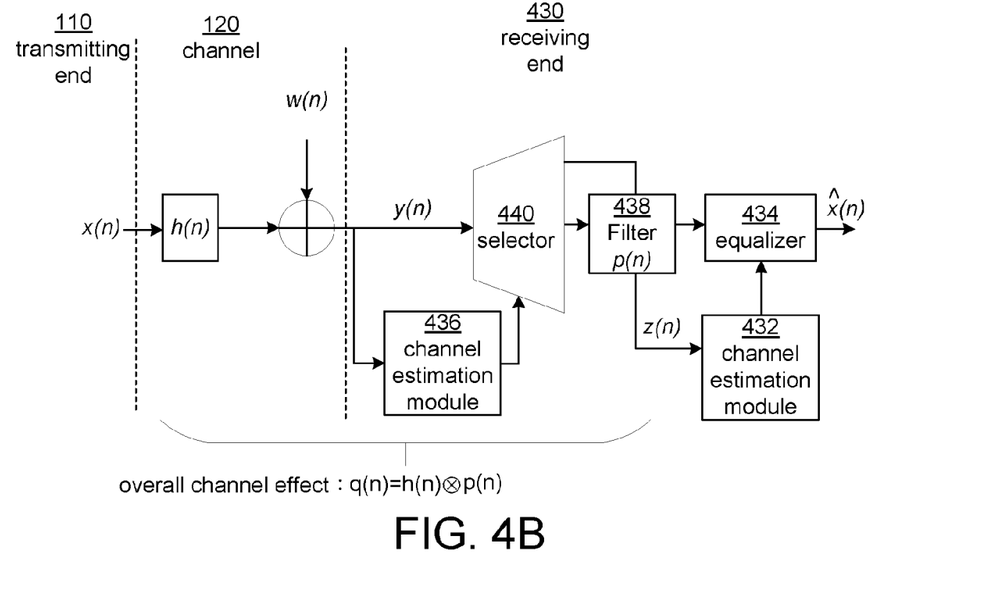
FIG. 4B is a block diagram of a receiving end according to another embodiment of the present invention.

FIG. 4B shows a block diagram of a receiving end 430 according to an embodiment of the present invention. Comparing to FIG. 4A, in FIG. 4B, the selector 440 is provided before the filter 438. According to the estimation result of the channel estimation module 436, the selector 440 selectively outputs the input signal y(n) to the equalizer 434 or to the filter 438. Assuming that the estimation result deems that the equalizer 434 requires the assistance of the filter 438, the selector 440 outputs the input signal y(n) to the filter 438, and thus the equalizer 434 and the channel estimation module 432 receive the filtered signal z(n). Assuming that the estimation result deems that the level of the multipath effect is not severe, the selector 440 directly outputs the input signal y(n) to the equalizer 434 and the channel estimation module 432, which is equivalent to turning off the filter 438.

Figure 4C:
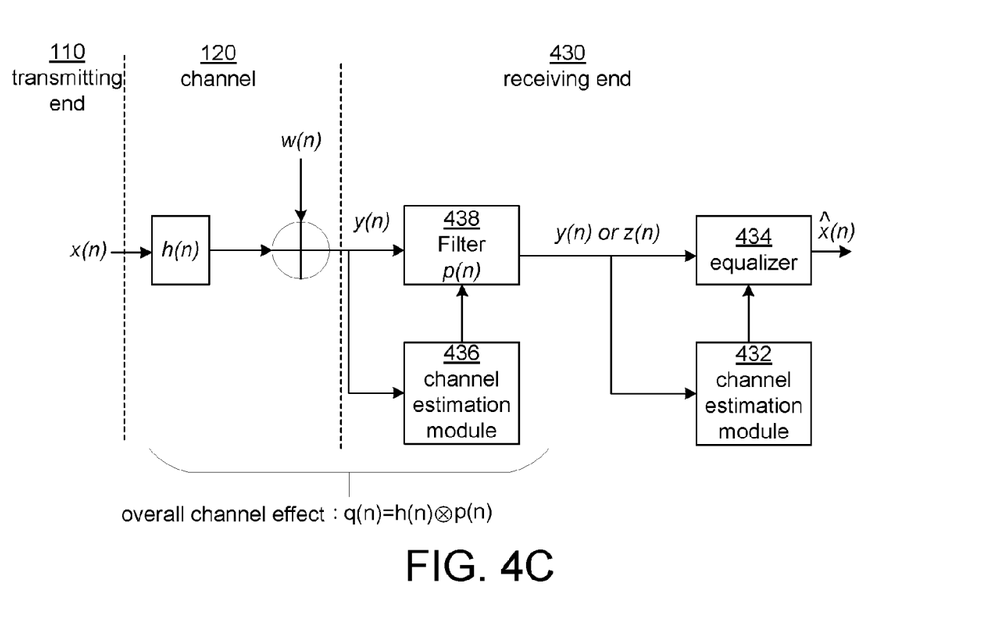
FIG. 4C is a block diagram of a receiving end according to another embodiment of the present invention.

FIG. 4C shows a block diagram of a receiving end 430 according to an embodiment of the present invention. Compared to FIG. 4A and FIG. 4B, the receiving end 430 in FIG. 4C may exclude the selector 440. The channel estimation module 436 sends the channel estimation result to the filter 438, which then directly outputs the unfiltered signal y(n) or the filtered signal z(n) to the equalizer 434 and the other channel estimation module 432 according to the channel estimation result. In another example, the filter 438 may also adjust the filtering effect from p(n) to not performing filtering at all according to the channel estimation result outputted from the channel estimation module 436. In other words, the result outputted by the filter 438 may be the unfiltered signal y(n) or the filtered signal z(n).

The channel estimation module 432 estimates the filtered signal z(n) from the filter 438, or directly estimates the received signal y(n). The purpose of the channel estimation module 432 is equivalent to that of the channel estimation module 132 in FIG. 1, and associated details are omitted herein.

Figure 8A:
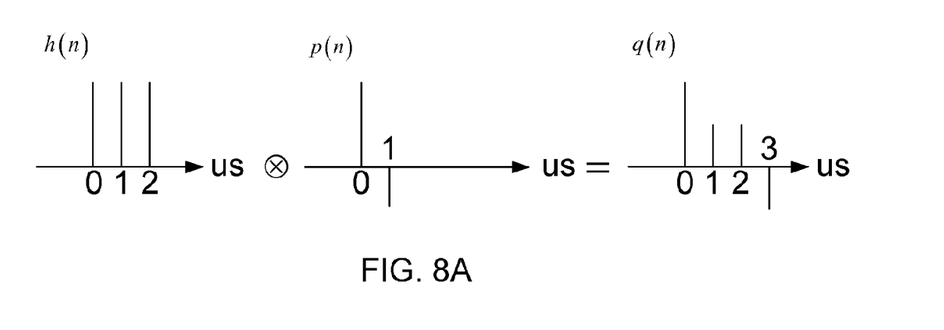
FIG. 8A is a schematic diagram of an effect of a filter according to an embodiment of the present invention.

FIG. 8A shows a schematic diagram of an effect of a filter according to an embodiment of the present invention. In FIG. 8A, the channel 120 has a multipath effect h(n) substantially equivalent to the multipath effect h(n) in FIG. 2A. The signal is propagated via three different paths in the channel 120, and thus has substantially equal amounts of energy in the three paths.

In the embodiment, the filtering effect p(n) of the filter 438 is set to maintain the peak value of a previous moment and decrease the peak value of a next moment. In other words, in the digital signal having the multipath effect, the filtering effect is to maintain the first-path digital signal that is first received and to attenuate the non-first-path digital signal. Alternatively speaking, the function of the filter 438 is to enlarge an energy difference between a first-path signal and a second-path signal in the received signal. Thus, in the signal y(n), the energy of the signal that first arrives is maintained, whereas the energy of the signals of the other two paths is attenuated. The influences of the multipath effect h(n) and the filtering effect p(n) are equivalent to the overall channel effect q(n) posed on the signal x(n) transmitted by the transmitting end to form the final signal z(n). Compared to the original signal y(n) that is not processed by the filtering effect p(n), although also having three paths, one primary path and two secondary paths can be distinguished for the signal z(n).

Figure 8B:
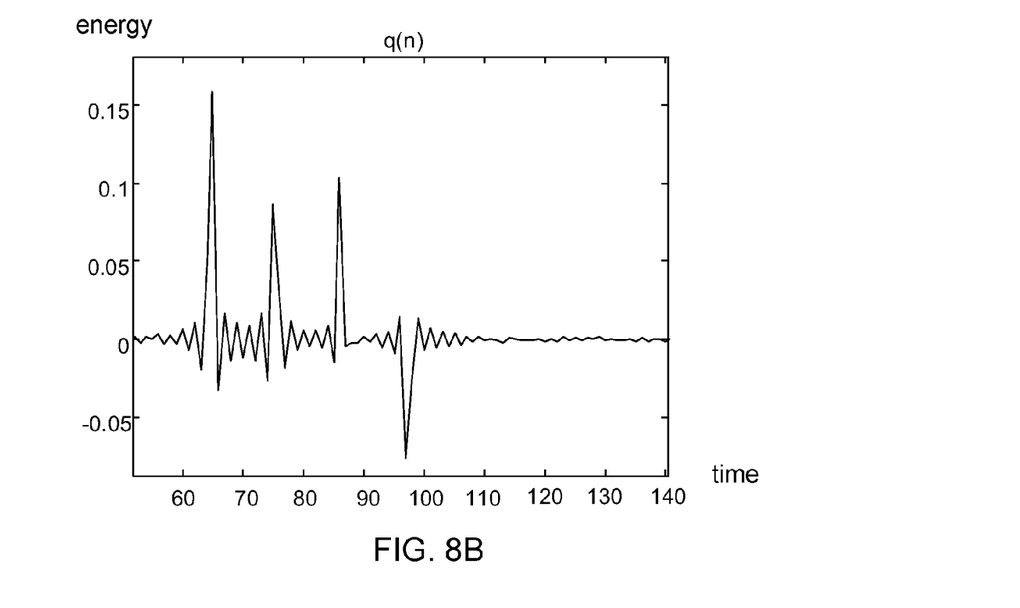
FIG. 8B is a schematic diagram of a simulated effect of a filter according to an embodiment of the present invention.

FIG. 8B shows a diagram of a simulated effect of a filter according to another embodiment of the present invention. Also referring to FIG. 8A, the influences of the multipath effect h(n) and the filtering effect p(n) carried out on the signal x(n) are equivalent to the overall channel effect q(n). Therefore, as shown in FIG. 8B, the filtered signal displays a primary path having a higher peak value and two secondary paths.

Figure 9:
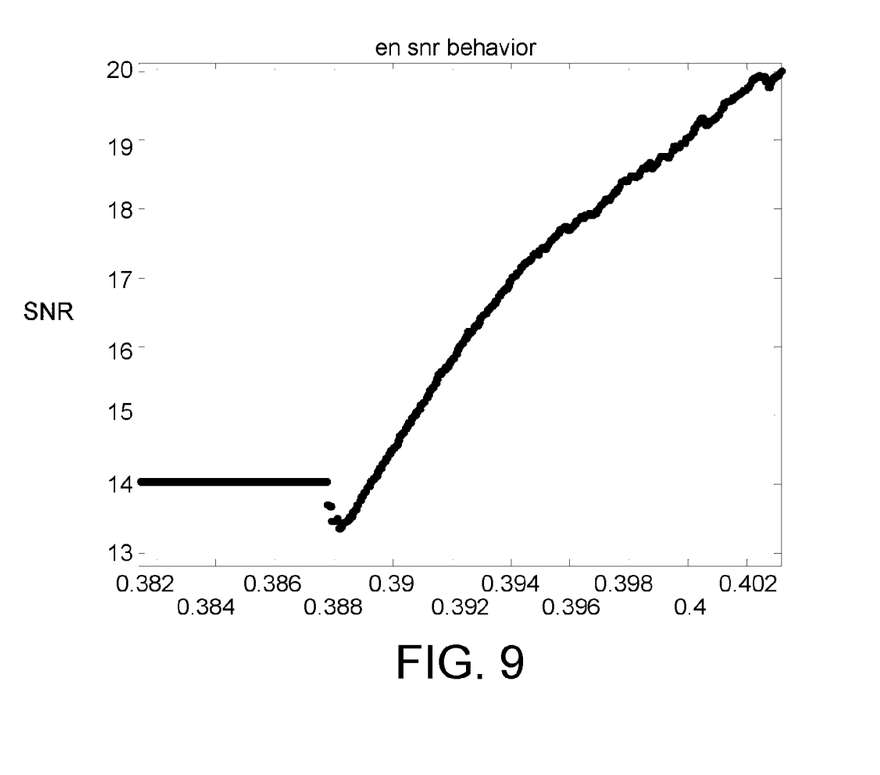
FIG. 9 is a schematic diagram of a simulated SNR of an equalizer according to an embodiment of the present invention.

FIG. 9 shows a diagram of an SNR of an output signal of the equalizer 434 versus the time according to an embodiment of the present invention. Compared to the diagram of an SNR of an output signal of the equalizer 134 of the prior art versus the time in FIG. 3, it is apparent that the equalizer 434 converges the SNR within an extremely short period of time. Thus, the receiving end 430 according to an embodiment of the present invention is capable of quickly obtaining signals with a high SNR for promoting subsequent interpretation operations.

One person skilled in the art can understand that, in addition to the exemplary multipath effect h(n) having three paths with substantially equal amounts of energy, the multipath effect may have various other forms. For example, two paths or fourth paths having substantially equal amounts of energy are considered as a multipath effect as well.

One person skilled in the art can also understand that, the filtering effect p(n) of the filter 438 is not limited to the exemplary type in FIG. 8A. For example, apart from attenuating the peak value of the signal at the position of 1 us, the peak value of the signal may also be attenuated at the position of 2 us. Alternatively, the peak value of the signal may be attenuated at the position of 0 us and be maintained at the position of 1 us.

Due to infinite variations of the multipath effect, variations of the filtering effect of the filter are also infinite, leading to infinite variations in a product from multiplying the two. For different kinds of multipath effects, the receiving end 430 may adopt different types of filters 438 for treating these multipath effects.

Figure 5A:
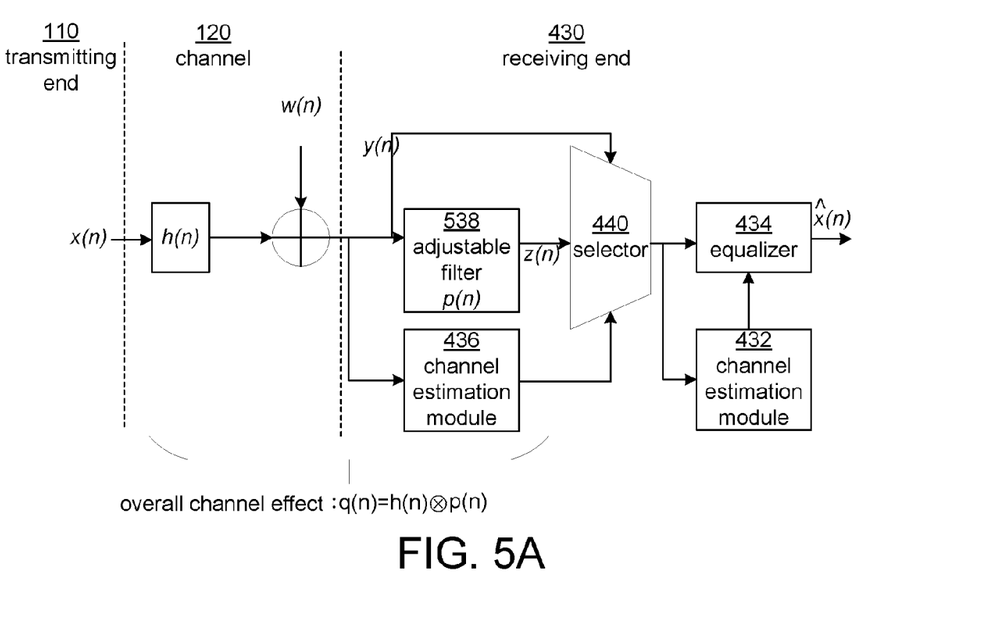
FIG. 5A is a block diagram of a receiving end according to another embodiment of the present invention.

FIG. 5A shows a block diagram of a receiving end 430 according to an embodiment of the present invention. Compared to the receiving end 430 in FIG. 4A, a difference of FIG. 5A is that the filter 438 originally having a fixed filtering effect is replaced by an adjustable filter 538 having an adjustable filtering effect. After the signal y(n) received by the receiving end 430 is estimated by the channel estimation module 436, the filtering effect p(n) may be correspondingly adjusted by the filter 538 according to the estimation result, i.e., the level of the multipath effect. As previously described, due to infinite variations of the multipath effect and the filtering effect, and such variations are not a focus of the present invention, associated details shall be omitted.

Figure 5B:
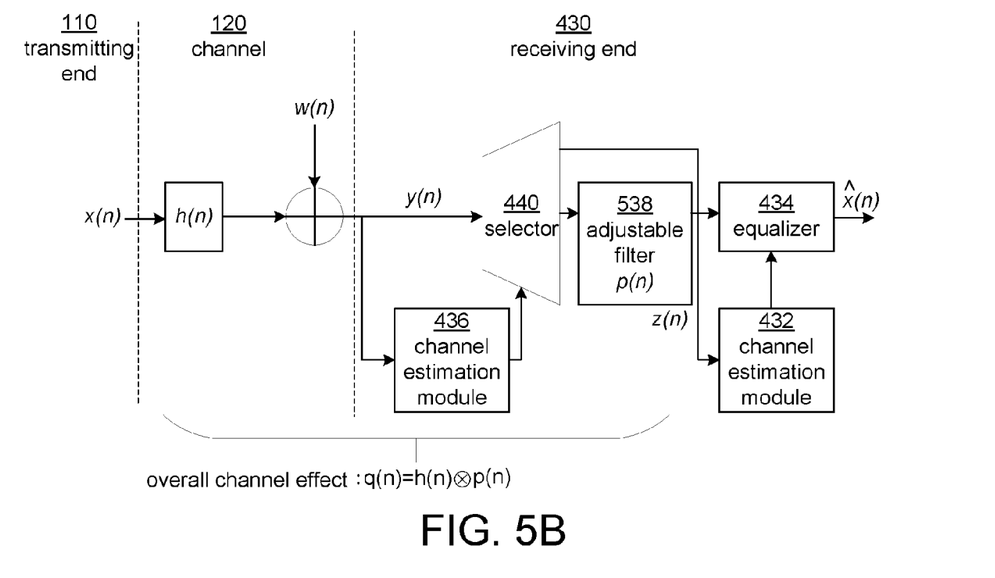
FIG. 5B is a block diagram of a receiving end according to another embodiment of the present invention.

FIG. 5B shows a block diagram of a receiving end 430 according to yet another embodiment of the present invention. Compared to the receiving end 430 in FIG. 5A, a difference of FIG. 5B is that the selector 440 is disposed before the adjustable filter 538 instead of being disposed after the adjustable filter 538. Compared to the receiving end 430 in FIG. 4B, a difference of FIG. 5B is that the filter 438 originally having a fixed filtering effect is replaced by an adjustable filter 538 having an adjustable filtering effect. According to the estimation result of the channel estimation module 436, the selector 440 selectively outputs the input signal y(n) to the equalizer 434 or to the filter 438. Assuming that the estimation result deems that the equalizer 434 requires the assistance of the adjustable filter 538, the selector 440 outputs the input signal y(n) to the filter 538, and thus the equalizer 434 and the channel estimation module 432 receive the filtered signal z(n). Assuming that the estimation result deems that the level of the multipath effect is not severe, the selector 440 directly outputs the input signal y(n) to the equalizer 434 and the channel estimation module 432, which is equivalent to turning off the adjustable filter 538. According to the estimation result, i.e., the level of the multipath effect, the adjustable filter 538 correspondingly adjusts the filtering effect p(n).

Figure 5C:
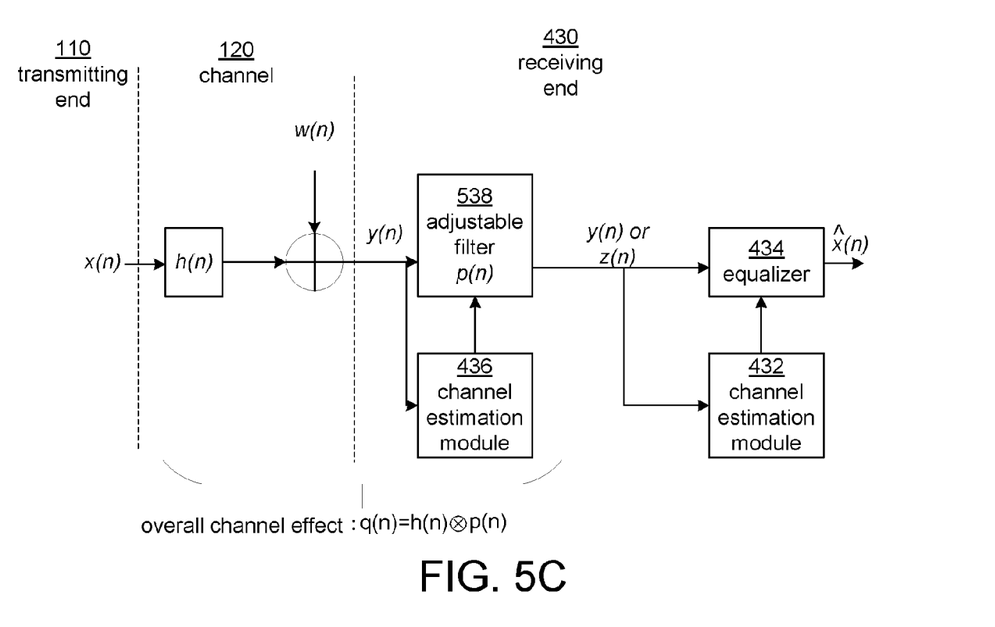
FIG. 5C is a block diagram of a receiving end according to another embodiment of the present invention.

FIG. 5C shows a block diagram of a receiving end 430 according to another embodiment of the present invention. Compared to the receiving end 430 in FIG. 4C, a difference of FIG. 5C is that the filter 438 originally having a fixed filtering effect is replaced by an adjustable filter 538 having an adjustable filtering effect. After the signal y(n) received by the receiving end 430 is estimated by the channel estimation module 436, the adjustable filter 538 correspondingly adjusts the filtering effect p(n) according to the estimation result. The filter 438 in FIG. 4B only supports two filtering levels—the filtering effect p(n) and zero filtering. In addition to the two above filtering levels, the filtering effect p(n) of the adjustable filter 538 is adjustable.

Figure 6A:
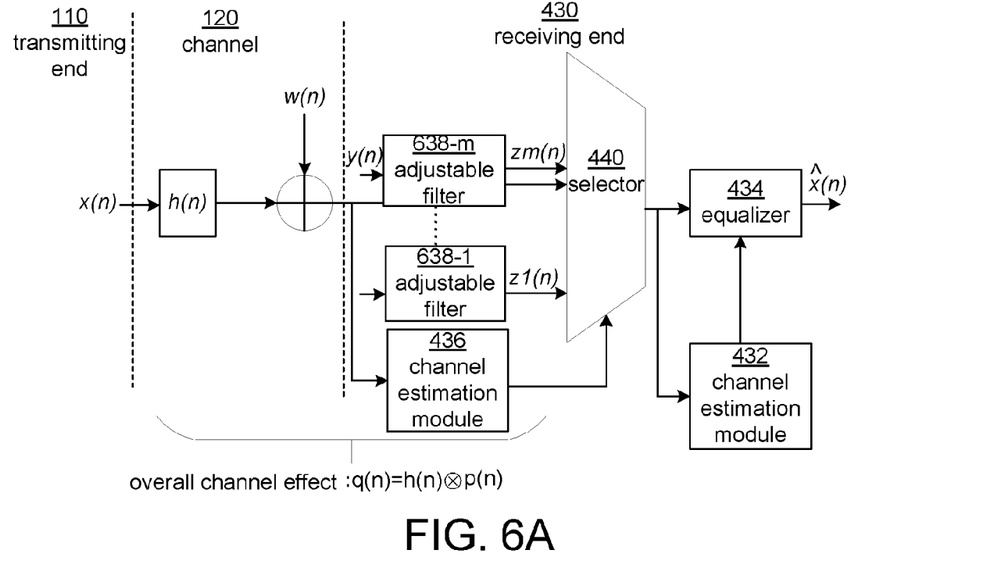
FIG. 6A is a block diagram of a receiving end according to yet another embodiment of the present invention.

FIG. 6A shows a block diagram of a receiving end 430 according to yet another embodiment of the present invention. In the embodiment in FIG. 5A, although the adjustable filter 538 is capable of treating more types of multipath effects, the design of the adjustable filter 538 may be too complicated to be applied to all kinds of applications. Therefore, in the embodiment in FIG. 6A, multiple (e.g., an m number of) filters 638-1 to 638-m are connected in parallel to the receiving end signal y(n) of the receiving end 430. Output ends of these filters 638-1 to 638-m are connected to an input end of a selector 440. In the embodiment, the output signal of the first filter 638-1 is z1(n), the output signal of the second filter 638-2 is z2(n), . . . , and the output signal of the $m^{th}$ filter 638-m is zm(n).

The filtering performances of the filters 638-1 to 638-m may be different. When the channel estimation module 436 estimates the receiving end signal y(n), the multipath effect h(n) in the channel can be estimated. According to the estimation result, the selector 440 selects the filtered result from one of the filters 638-1 to 638-m and outputs its filtered result to the equalizer 434 and the other channel estimation module 432.

In the embodiment in FIG. 6A, these filters 638-1 to 638-m having fixed filtering performances respectively yield preferred filtering effects for different types of multipath effects. Thus, the equalizer 434 is enabled to quickly converge the SNR to a usable level.

Figure 6B:
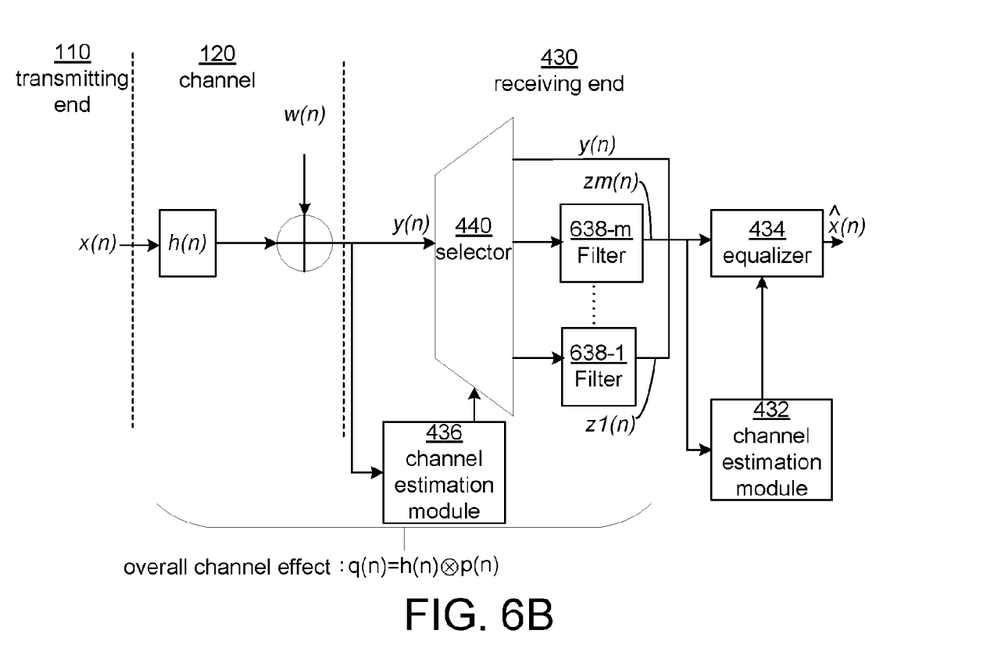
FIG. 6B is a block diagram of a receiving end according to yet another embodiment of the present invention.

FIG. 6B shows a block diagram of a receiving end 430 according to yet another embodiment of the present invention. A difference of FIG. 6B from the embodiment in FIG. 6A is that, the selector 440 is disposed before the filters 638-1 to 638-m instead of being disposed after the filters 638-1 to 638-m. According to the channel estimation result, the selector 440 selects a most appropriate filter from the filters 638-1 to 638-m, and sends the received signal y(n) to the selected filter. Alternatively, the selector 440 sends the received signal y(n) to the equalizer 434 and the channel estimation module 432.

Figure 7:
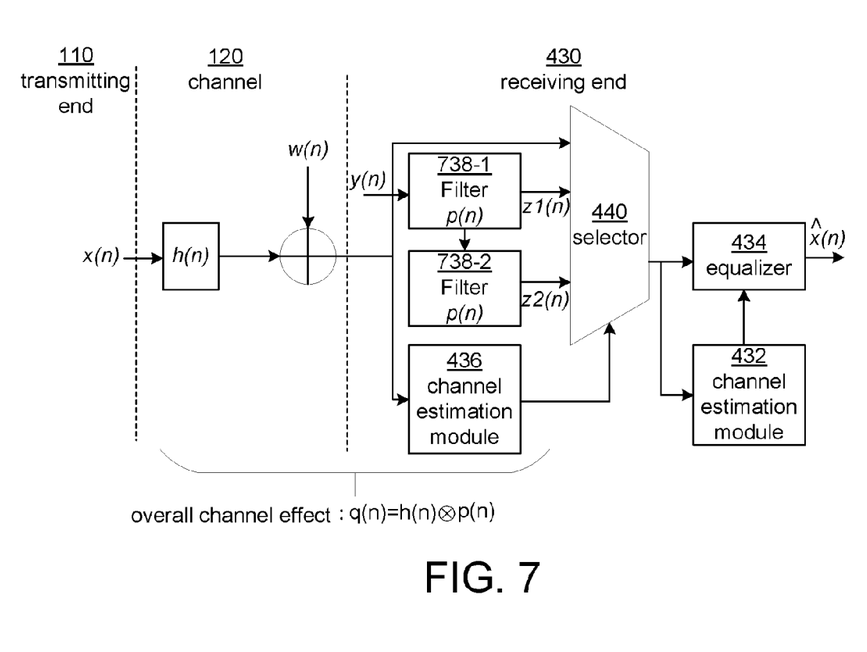
FIG. 7 is a block diagram of a receiving end according to another embodiment of the present invention.

FIG. 7 shows a block diagram of a receiving end 430 according to another embodiment of the present invention. Compared to the parallel connection in FIG. 6, multiple filters 738-1 and 738-2 in the embodiment in FIG. 7 are connected in series. The filtering performances of the filters 738-1 to 738-2 may be different or the same. An output of the filter 738-1 is connected to an input end of the selector 440 and an input end of the other filter 738-2. An output end of the filter 738-2 is connected to anther input end of the selector 440.

In other words, the three input ends of the selector 440 are respectively connected to the signal y(n) received at the receiving end 430, a a filtered result z1(n) of the filter 738-1, and a linear convoluted filtered result z2(n) of the filter 738-1 and the filter 738-2. Similar to FIG. 6, the channel estimation module 436 estimates the receiving end signal y(n) to estimate the multipath effect h(n) in the channel 120. According to the estimation result, the selector 440 selects and outputs one of the input ends to the equalizer 434 and the other channel estimation module 432. Although only two filters 738-1 and 738-2 connected in series are depicted in FIG. 7, the quantity of the filters connected in series is not limited by the present invention.

Summarizing the embodiments of FIG. 5A to FIG. 7, the receiving end 430 may employ one single filter having a fixed filtering effect, one single filter having an adjustable filtering effect, or multiple filters. When the receiving end 430 employs multiple filters, these filters may receive the signal y(n) in parallel, receive the signal y(n) after being connected in series, or be parallel and series to receive the signal y(n). The selector that subsequently receives the outputs of the multiple filters selects an appropriate filter according to the channel condition estimated by the channel estimation module 436, particularly according to the condition of the multipath effect, thereby facilitating the subsequent equalizer 434 to quickly converge the SNR of the output of the equalizer 434 to a usable level.

One person skilled in the art can understand that these embodiments are supportive of an important technical feature of the present invention. More specifically, filtering is first performed according to the channel estimation result, such that the influences of the multipath effect in the digital signal received by the equalizer are not as great as those in the original digital signal. Thus, the equalizer is able to reduce the time for converting the SNR of its output. Through the above technical feature of the present invention, the time required for convergence can be significantly reduced.

Figure 10:
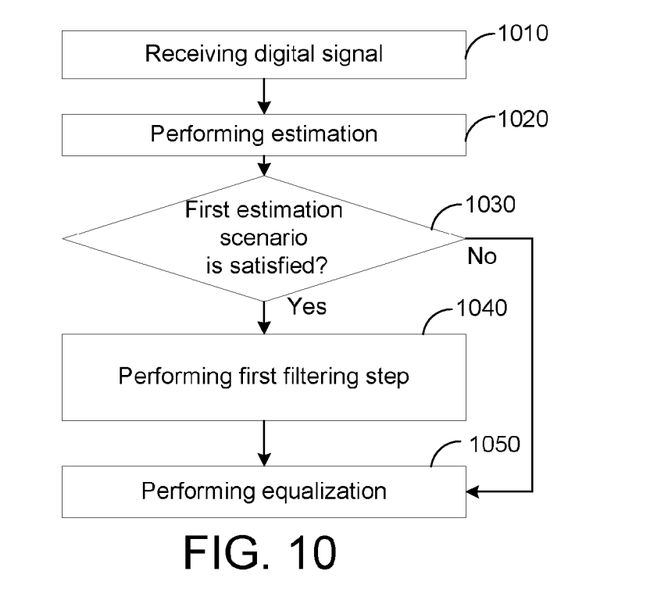
FIG. 10 is a flowchart of a receiving method according to an embodiment of the present invention.

FIG. 10 shows a flowchart of a receiving method according to an embodiment of the present invention. The receiving method disclosed in FIG. 10 is applicable to a receiving end. One person skilled in the art may refer to the embodiment in FIG. 4A to better understand details of the receiving method. In step 1010, a digital signal is received. The digital signal may refer to the signal y(n) in FIG. 4A. In step 1020, channel estimation is performed on the received digital signal y(n) to estimate whether the signal is distorted by a multipath effect in the channel.

In step 1030, according to the estimation result of step 1020, it is determined whether the channel satisfied a first estimation scenario. The first estimation scenario may refer to a certain type of multipath effect. When it is determined that the channel satisfies the first estimation scenario in step 1030, the receiving method proceeds to step 1040. In step 1040, a first filtering step is performed on the received digital signal according to the first estimation scenario. Step 1050 is performed after obtaining an output of the first filtering step. Thus, in step 1050, an output signal having a higher SNR can be more quickly converged. When it is determined that the channel does not satisfy the first estimation scenario in step 1030, the receiving method proceeds to step 1050. In step 1050, the received digital signal is directly equalized.

In an embodiment of the present invention, the first estimation scenario does not refer to only a certain type of multipath effect, and may refer to certain types of multipath effect. When it is determined in step 1020 that the channel satisfies these types of multipath effect, the first filtering step having an adjustable effect may be utilized to correspond to these types of multipath effect in step 1040. One person skilled in the art may refer to the embodiment in FIG. 5.

Figure 11:
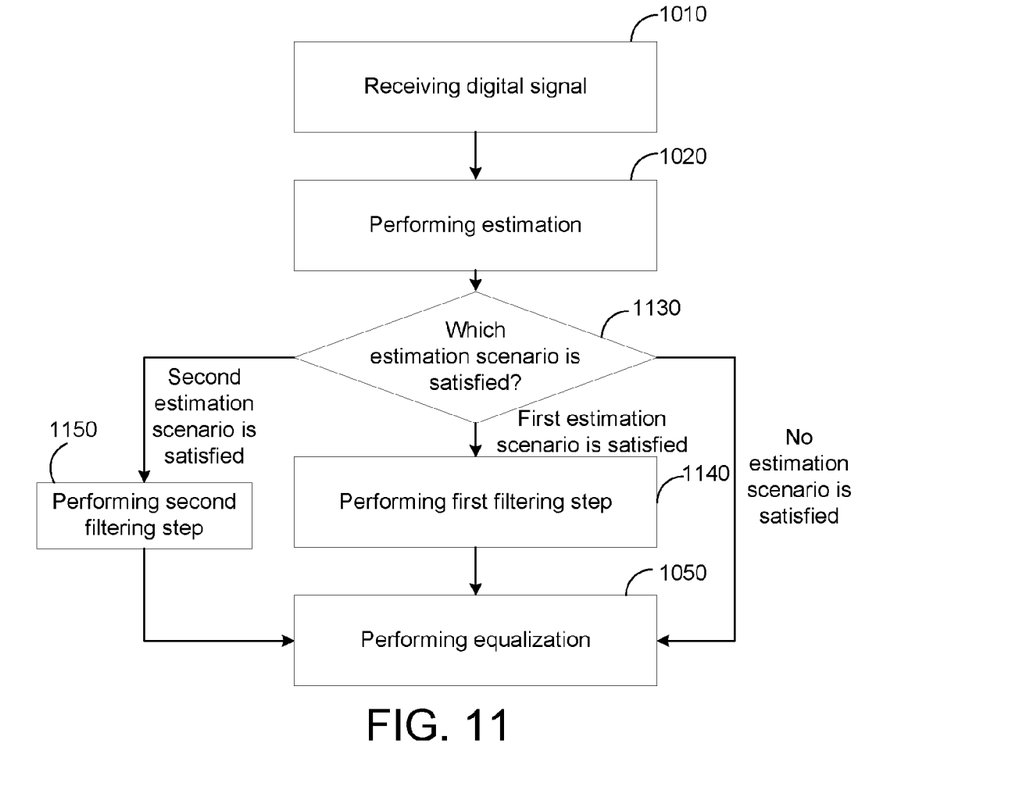
FIG. 11 is a flowchart of a receiving method according to another embodiment of the present invention.

FIG. 11 shows a flowchart of a receiving method according to another embodiment of the present invention. One person skilled in the art may refer to the embodiment in FIG. 6A to better understand details of the receiving method. Compared to the embodiment in FIG. 10, after estimating the channel in step 1020, the receiving method proceeds to step 1130 to determine which estimation scenario the channel satisfies. Assuming that the first estimation scenario is satisfied, the receiving method proceeds to step 1140 to perform a first filtering step on the received signal. Assuming that the channel satisfies a second estimation scenario, the receiving method proceeds to step 1150 to perform a second filtering step on the received signal.

One person skilled in the art can understand that, in the embodiment in FIG. 11, the filtering effects in step 1140 and step 1150 are different and correspond to different estimation scenarios. Further, step 1140 and step 1150 may be simultaneously performed, and the filtering output of step 1140 or step 1150 is selected and outputted in step 1150. Similarly, assuming it is determined in step 1130 that the channel does not satisfy the first and second estimation scenarios, step 1050 of equalization may be directly performed on the received digital signal, as in the embodiment in FIG. 10.

Figure 12:
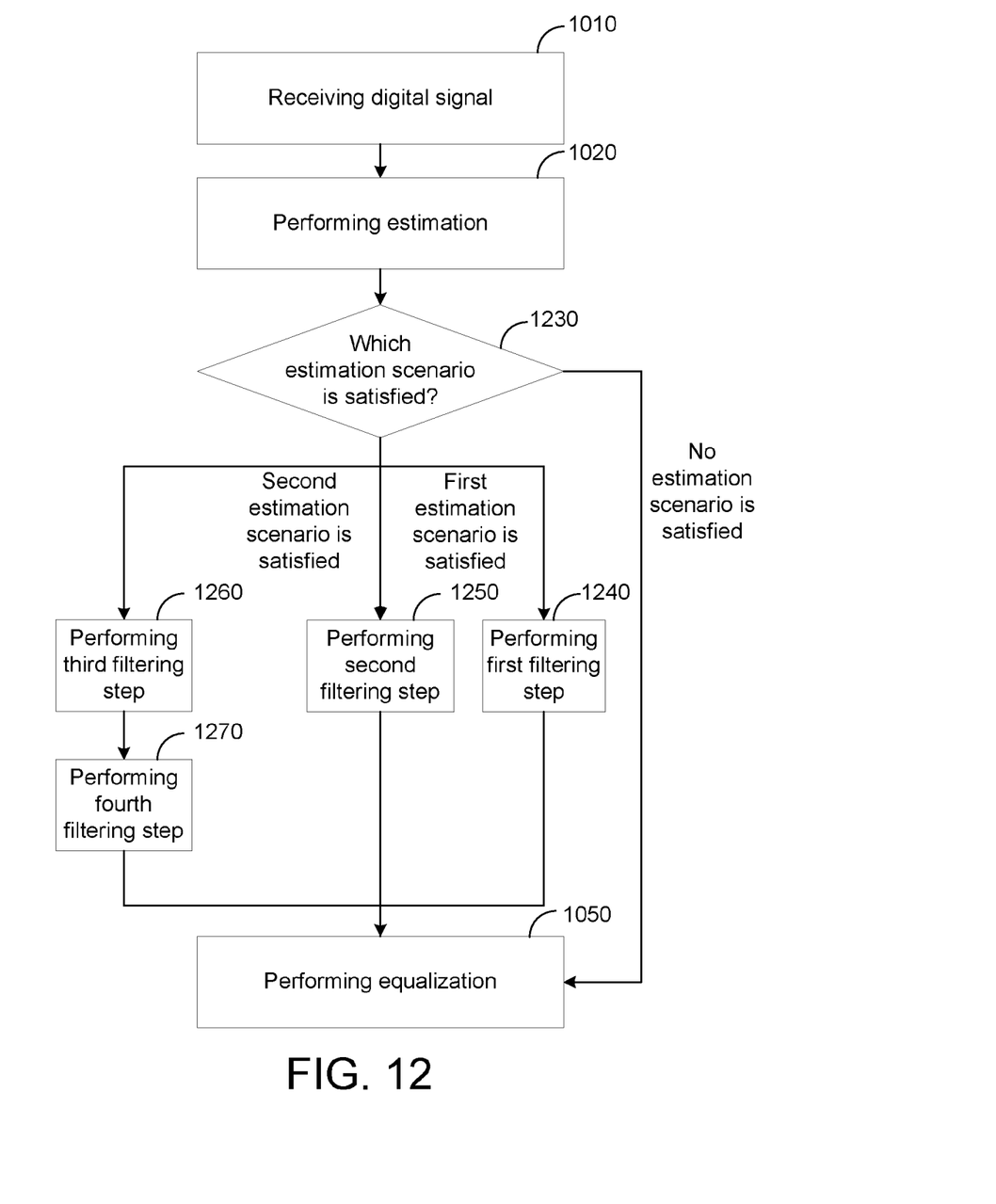
FIG. 12 is a flowchart of a receiving method according to yet another embodiment of the present invention

FIG. 12 shows a flowchart of a receiving method according to yet another embodiment of the present invention. One person skilled in the art may refer to the embodiment in FIG. 7 to better understand details of the receiving method. Compared to the receiving method in FIG. 11, a difference of the embodiment in FIG. 12 is that, apart from performing step 1240 of a first filtering step when a first estimation scenario is satisfied and performing step 1250 of a second filtering step when a second estimation scenario is satisfied, step 1260 of a third filtering step may be performed. Assuming the channel satisfies the third estimation scenario, step 1260 of the third filtering step may be performed. In step 1270, a fourth filtering step is performed to again filter an output of the third filtering step in step 1260. An output signal after two filtering processes is then equalized in step 1050.

In the embodiment in FIG. 12, step 1260 of the third filtering step may be equivalent to step 1240 of the first filtering step, and step 1270 of the fourth filtering step may be equivalent to step 1250 of the second filtering step. In other words, three different estimation scenarios may be satisfied with filtering steps of two filtering effects. Assuming that there are filtering steps A, B, and C with three different filtering effects, a condition a, a condition b, a condition c, a condition ab, a condition bc, a condition ac and a condition abc estimated by channel estimation can be corresponded. One person skilled in the art can easily deduce that, different channel estimation scenarios can be treated by parallel and serial filtering steps having different filtering effects.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A receiving apparatus, applied to a receiving end of a communication device comprising an equalizer, the receiving apparatus comprising:
   a filter, configured to filter a received signal to reduce a multipath effect of the received signal and to output a filtered signal, wherein the filter is for enlarging an energy difference between a first-path signal and a second-path signal in the received signal; and
   a channel estimator, configured to perform channel estimation on the received signal to generate an estimation result, which is for determining which of the received signal and the filtered signal is to be selected and sent to the equalizer.

2. The receiving apparatus according to claim 1, wherein the filtered signal accelerates an equalization speed of the equalizer.

3. The receiving apparatus according to claim 1, wherein a filtering parameter of the filter is adjusted according to the estimation result.

4. The receiving apparatus according to claim 1, further comprising:
   a selector, configured to select and send one of the received signal and the filtered signal to the equalizer according to the estimation result.

5. The receiving apparatus according to claim 1, further comprising:
   another filter, configured to filter the received signal to reduce the multipath effect of the received signal and to output another filtered signal, wherein a filtering parameter of the another filter is different from a filtering parameter of the filter; and
   a selector, configured to select and send one of the received signal and the filtered signal to the equalizer according to the estimation result.

6. The receiving apparatus according to claim 1, further comprising:
   another filter, configured to filter the received signal to reduce the multipath effect of the received signal.

7. The receiving apparatus according to claim 1, wherein the estimation result is associated with a level of the multipath effect.

8. The receiving apparatus according to claim 7, wherein when the estimation result indicates the level of the multipath effect is smaller than a threshold, the channel estimator renders the received signal to be sent to the equalizer without undergoing the filtering process.

9. A receiving method, applied to a receiving end of a communication device comprising an equalizer, the receiving method comprising:
   filtering a received signal to reduce a multipath effect of the received signal, and outputting a filtered signal for enlarging an energy difference between a first-path signal and a second-path signal in the received signal;
   performing channel estimation on the received signal to generate an estimation result; and
   selecting and sending one of the received signal and the filtered signal to the equalizer.

10. The receiving method according to claim 9, wherein the filtered signal accelerates an equalization speed of the equalizer.

11. The receiving method according to claim 9, wherein in the step of filtering the received signal to reduce the multipath effect of the received signal, a filtering parameter of the filtering step is adjusted according to the estimation result.

12. The receiving method according to claim 9, further comprising:
   performing another filtering step on the received signal to reduce the multipath effect of the received signal, and outputting another filtered signal, wherein a filtering parameter of the another filtering step is different from a filtering parameter of the filter step; and
   selecting and sending one of the filtered signal and the another filtered signal to the equalizer according to the estimation result.

13. The receiving method according to claim 9, further comprising:
   performing another filtering step on the received signal to reduce the multipath effect of the received signal.

14. The receiving method according to claim 9, wherein the estimation result is associated with a level of the multipath effect.

15. The receiving method according to claim 14, wherein when the estimation result indicates the level of the multipath effect is smaller than a threshold, the received signal to be sent to the equalizer without undergoing the filtering step.

* * * * *